United States Patent [19]

Key, Jr.

[11] 4,157,818
[45] Jun. 12, 1979

[54] X-Y MOVABLE WORK HOLDER
[75] Inventor: Robert T. Key, Jr., Phoenix, Ariz.
[73] Assignee: Motorola, Inc., Schaumburg, Ill.
[21] Appl. No.: 856,472
[22] Filed: Dec. 1, 1977
[51] Int. Cl.² .................................................. G01B 11/26
[52] U.S. Cl. ..................................................... 269/73
[58] Field of Search ..................... 269/71, 73; 350/86, 350/90; 108/137, 143; 248/17, 399

[56] References Cited
U.S. PATENT DOCUMENTS 3,044,354  7/1962  Brosicke ................................ 350/86
3,870,416  3/1975  Brady et al. ............................ 350/90

*Primary Examiner*—Robert C. Watson
*Attorney, Agent, or Firm*—John A. Fisher

[57] ABSTRACT

A workholder stage that includes and X-Y movable work mounting plate, a stationary base plate, an intermediate coupling plate and two pairs of perpendicularly oriented leaf springs. One pair of leaf springs is connected to the base plate and to the intermediate coupling plate while the other pair is connected to the work mounting plate and to the intermediate coupling plate.

5 Claims, 2 Drawing Figures

U.S. Patent    Jun. 12, 1979    4,157,818

X-Y MOVABLE WORK HOLDER

BACKGROUND

This invention relates to work holders and more particularly to a work holder which is adjustable in the X and Y directions to orient a work piece under an appropriate operating instrument or tool.

In the past, adjustable work holders have utilized slides and ways to provide movement in X and Y directions. Since these parts are subject to friction and wear, ball or roller bearings have been provided as well. Such work holders have been expensive to build and maintain.

Movable work holders are used widely in the semiconductor art. Examples of this are in wire bonders and wafer exposure equipment. In this use, usually very little travel is required to bring the work piece into alignment but such alignment is extremely critical and must be precise.

SUMMARY

It is an object of this invention to provide a less expensive X-Y work holder stage. A further object is to provide a work holder which has no sliding or rolling parts requiring lubrication and maintenance. More particularly, it is an object to the invention to provide a more economical X-Y work holder stage for the semiconductor art.

In accordance with these objects there is provided a work holder stage that includes an X-Y movable work mounting plate, a stationary base plate and two pairs of perpendicularly oriented leaf springs. One pair of leaf springs is connected to the base plate and to an intermediate coupling plate while the other pair is connected to the work mounting plate and to the intermediate coupling plate.

THE DRAWINGS

Figure 1:
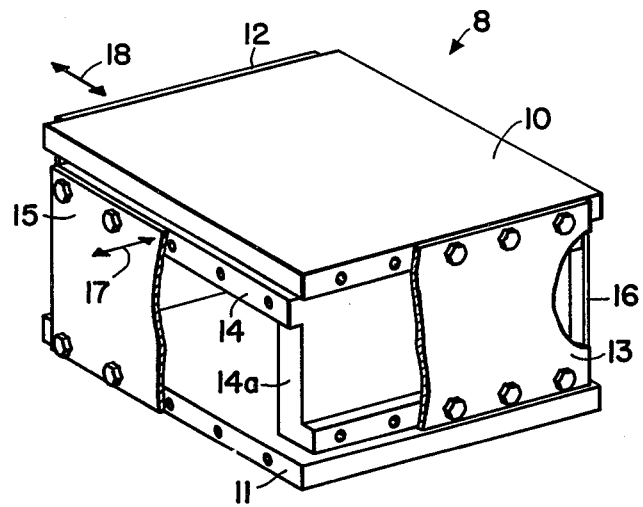
Figure 2:
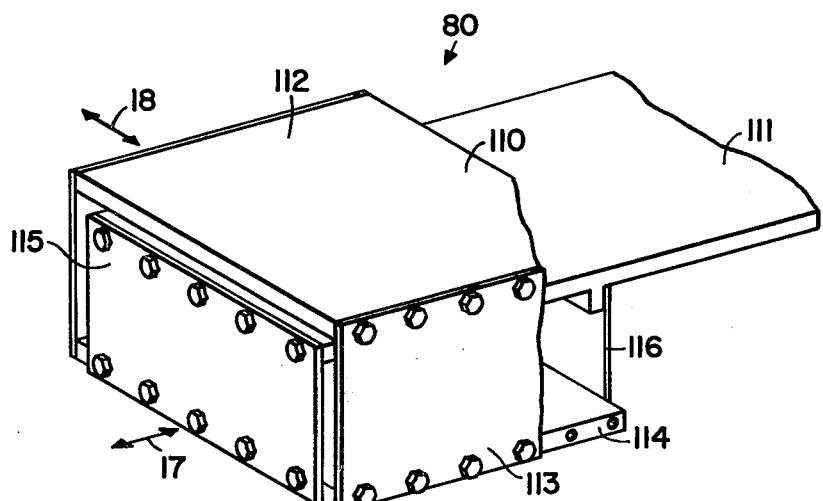

Further objects and advantages of the invention will be understood from the following complete description thereof and from the drawings wherein:

FIG. 1 is a perspective view of an X-Y movable work holder in accordance with the invention; and FIG. 2 is a perspective view of a second embodiment thereof.

COMPLETE DESCRIPTION

As shown in FIG. 1, the work holder stage 8 includes a work piece mounting plate 10 and a stationary base plate 11. It will be understood that the term stationary is a relative term since the base plate may be connected to some form of carrier which can move the work holder stage into and out of position at a work station. Leaf springs 12 and 13 are located on opposite sides of the stage 8 with one end of each spring attached to the sides of the work piece mounting plate 10. The other ends of the springs 12, 13 are attached to opposite sides of an intemediate coupling plate 14. Similarly, leaf springs 15 and 16 are located at the other opposite sides of the stage 8 with one end of each spring attached to the sides of the intermediate coupling plate 14. The other ends of the springs 15, 16 are attached to opposite sides of a base plate 11. One pair of leaf springs 15, 16 is thus perpendicularly oriented with respect to the other pair of leaf springs 12, 13.

Suitable means 17 and 18 are provided to move the work piece mounting plate in the X and Y directions, respectively. While these means are merely indicated by arrows, it will be understood that the actual mechanism might be hand adjustment screws or computer controlled servo motors. In any case, the force of means 17 will cause flexure of leaf springs 15 and 16 and hence movement of the work holder mounting plate (together with the intermediate coupling plate) in the X direction. The force of means 18 effects flexure of springs 12 and 13 and movement in the Y direction. Thus, any work piece may be readily aligned in the X and Y directions.

While the work holder is suitable where small precise adjustments are required, one should not use it for large amounts of travel unless the leaf springs are made apropriately long so that the change in elevations of the mounting plate will not be a factor.

While the intermediate coupling plate 14 may be flat, for compactness, legs 14A are provided so that the plate 14 is channel shaped. Thus, leaf springs 12 and 13 may be generally parallel to the legs 14 and connected to the lower ends thereof.

In accordance with a second embodiment of the invention shown in FIG. 2, the work holder stage 80 includes a work piece mounting plate 110 and a stationary base plate 111. Again, it will be understood that the term stationary is a relative term since the base plate may be connected to some form of carrier which can move the work holder stage into and out of position at a work station. Leaf springs 112 and 113 are located on opposite sides of the stage 80 with one end of each spring attached to the sides of the work piece mounting plate 110. The other ends of the springs 112, 113 are attached to opposite sides of an intermediate coupling plate 114.

Similarly, the leaf springs 115 and 116 are located with one of the pair on each of the other opposite sides of the stage 80 and hence are perpendicularly oriented with respect to leaf springs 112 and 113. One end of each of the leaf springs 112, 113 is attached to the intermediate coupling plate 114; the other end is connected to base plate 111.

Again, suitable means 17 and 18 are provided to move the work piece mounting plate in the X and Y directions, respectively. The force of means 17 will cause flexure of leaf springs 115 and 116 and hence movement of the work holder mounting plate (together with the intermediate coupling plate) in the X direction. The force of means 18 effects flexure of springs 112 and 113 and movement in the Y direction. Thus, any work piece may be readily aligned in the X and Y directions. Thus, the compactness of the work holder is preserved by mounting the coupling plate below the base plate.

What is claimed is:

1. A work holder stage that includes a work mounting plate movable in X and Y directions, a stationary base plate, first and second pairs of perpendicularly oriented leaf springs, the first pair of leaf springs connected between the base plate and an intermediate coupling plate to permit motion in one of said X and Y directions while the second pair of leaf springs are connected between the work mounting plate and the intermediate coupling plate to permit motion in the other of said X and Y directions.

2. A work holder as recited in claim 1 wherein said coupling plate is channel-shaped.

3. A work holder as recited in claim 1 wherein said coupling plate is connected to the side of the base plate opposite to the location of the work mounting plate.

4. A work holder stage comprising: a first movable work mounting plate; a second stationary base plate positioned in a plane parallel to said first plate; and a third intermediate mounting plate positioned between said first and said second plates; first and second leaf springs joining said first plate and said third plate, said first and second springs being attached at ends thereof to opposing edges of said plates and allowing motion of said first plate n a first direction; third and fourth leaf springs joining said second plate and said third plate, said third and fourth leaf springs oriented perpendicularly to said first and second leaf springs and attached at ends thereof to opposing edges of said plates and allowing motion of said first plate in a second direction perpendicular to said first direction.

5. A work holder stage comprising: a first fixed plate; a second intermediate coupling plate positioned in a plane parallel to and below said first fixed plate; first and second leaf springs attached to opposite edges of said first and second plates and extending between said plates; a third plate movable in X and Y directions and positioned in a plane parallel to and above said first fixed plate; third and fourth leaf springs attached to opposite edges of said second and third plates and extending between said plates, said first and second leaf springs capable of allowing motion of said third plate in one of said X and Y directions and said third and fourth leaf springs capable of allowing motion of said third plate in the other of said X and Y directions.

* * * * *